W. KILLINGSWORTH.
MACHINE FOR TRIMMING THE ENDS OF ARTICLES.
APPLICATION FILED SEPT. 3, 1914.

1,246,935.

Patented Nov. 20, 1917.
4 SHEETS—SHEET 1.

WITNESSES
W. Ray Taylor
Julius J. Prible

INVENTOR
Wilber Killingsworth
by Geyer & Popp
ATTORNEYS

UNITED STATES PATENT OFFICE.

WILBER KILLINGSWORTH, OF COLUMBUS, OHIO, ASSIGNOR TO THE PHINNEY ENGINEERING COMPANY, OF CHILLICOTHE, OHIO, A CORPORATION OF OHIO.

MACHINE FOR TRIMMING THE ENDS OF ARTICLES.

1,246,935.     Specification of Letters Patent.     Patented Nov. 20, 1917.

Application filed September 3, 1914. Serial No. 860,008.

*To all whom it may concern:*

Be it known that I, WILBER KILLINGSWORTH, a citizen of the United States, residing at Columbus, in the county of Franklin and State of Ohio, have invented new and useful Improvements in Machines for Trimming the Ends of Articles, of which the following is a specification.

This invention relates to a machine for snipping or trimming off the ends of articles and more particularly to a machine for cutting off the opposite ends of string beans preparatory to canning or packing the same for the trade.

It is the object of this invention to provide a machine for this purpose which is comparatively simple and durable in construction and reliable in operation, which has a large capacity and which will effectively cut off or snip the ends of beans regardless of the length or thickness of the same and without undue waste of material or liability of clogging the machine.

In the accompanying drawings:

Fig. 8 is a fragmentary end elevation of the blower and associated parts forming part of my improved machine.

Similar characters of reference indicate corresponding parts throughout the several views.

Referring to the construction of machine shown in Figs. 1-8, 1 represents the main frame of the machine which may be of any suitable construction. Upon this frame are mounted two longitudinal side walls or boards 2, 3 which are arranged in an upright position and parallel with each other, so as to form an intervening space between the same. Between these two walls is arranged an endless carrier which is provided on its outer side with a plurality of pockets, buckets or troughs 4 which are open at the top and also at opposite ends thereof. In its preferred form, this carrier comprises an endless belt or apron 5 which passes with its opposite turns around a front receiving pulley 6 and a rear delivery pulley 7, which pulleys are arranged horizontally in line so as to form an operative horizontal upper stretch of this belt and a lower horizontal inoperative stretch of the same. The pulleys are turned in the direction for moving the upper operative stretch of the carrier belt forwardly from the receiving pulley to the delivery pulley and the inoperative stretch rearwardly from the delivery pulley to the receiving pulley. The receiving pulley is mounted on a horizontal front shaft 8 which is arranged transversely and journaled in suitable bearings arranged on the front ends of the side walls, while the delivery pulley is mounted on a similar shaft 9 journaled in suitable bearings on the rear ends of the side walls and provided outside of one of these walls with a driving pulley 10 which is adapted to receive a driving belt for transmitting motion to the carrier. The pockets or buckets of the endless carrier are preferably formed by means of a plurality of propelling members each of which is of substantially L-shaped form in cross section and is secured with one of its base flanges 11 to the outer side of the carrier belt so that its other free flange 12 projects outwardly therefrom and extends crosswise of the carrier belt from one edge thereof to the other in the form of a wing, flight or wall. These propelling members are arranged close together on the carrier belt and preferably so close that when the same are traveling on the horizontal stretch of the carrier-belt, the horizontal base flanges thereof engage with each other, or practically so, and thereby form the plurality of pockets, buckets or troughs 4 between the several laterally projecting flanges or wings of the propelling members. The width of the endless carrying belt and the pockets thereon is substantially equal to the width between the opposing inner sides of the walls 2, 3 so that the latter, except at certain points as will be hereinafter described, form closures for the opposite ends of the pockets of the endless carrier and serve to confine any articles deposited in the same against escaping laterally from these pockets while traveling with the upper operative stretch of the carrier. Assuming that string beans are to be trimmed, snipped or cut off at opposite ends in this machine, such beans are deposited in those pockets of the carrier which are adjacent to the receiving pulley, so that one or more of the beans are arranged lengthwise in each pocket but transversely relative to the direction of movement of the carrier. The beans may be deposited in the pockets of the carrier either by hand or by suitable feed mechanism, but for sanitary reasons, it is preferable to employ for this purpose an automatic feeding mechanism, such for instance, as that shown and described in an application for patent filed by myself on the 18th day of August 1914, and serially numbered 857320. This automatic feeding mechanism is indicated by dotted lines 13 in Fig. 2, and is designed to feed the beans from the right hand side of the machine over the near longitudinal side wall 2 and toward the companion far side wall 3. In order to prevent such beans from being spilled over the far wall 3 by the feeding device, this wall is provided with a guard or plate 14 rising from its upper edge adjacent to the receiving pulley 6, so as to deflect any beans engaging therewith into the carrying pockets immediately below the same. Such beans which are received from the feeding mechanism are deposited in the pockets in a position in which they are near to the far side wall 3 and so that one or more of the beans in this pocket engage at one of their ends with this wall, which result is utilized to advantage in effecting the engaging of one end of the beans preparatory to cutting or snipping off the respective ends thereof.

Figure 2:
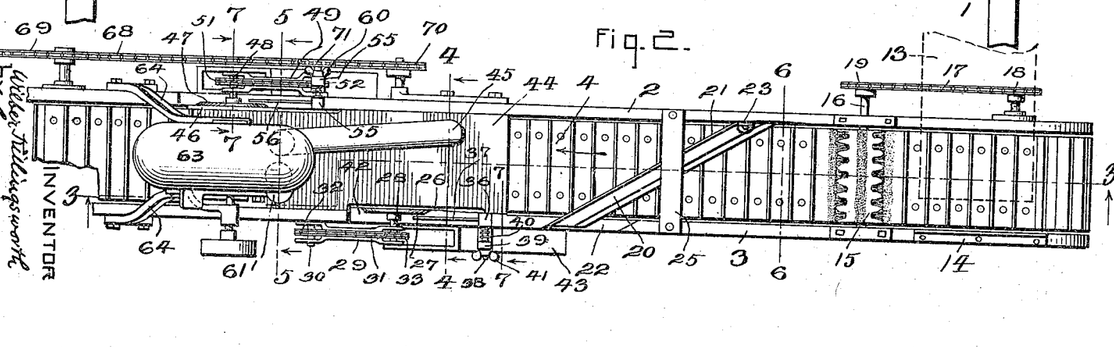
Fig. 2 is a top plan view thereof.

As the beans are carried forwardly by the operative pockets after being deposited therein, the same are carried underneath a clearing or shifting device which operates on any beans which may be lodged on the upper edges of the pocket and causes the same to be moved into the pockets. This clearing or shifting device may be variously constructed, but as shown in the drawings, the same comprises a horizontal rotatable brush 15 arranged transversely above the path of the pocket wing in front of the place where the beans are deposited in the pockets and mounted on a shaft 16 which is journaled in suitable bearings on the upper edges of the side walls. This brush is turned in the direction for causing its lower part which faces the pockets to move rearwardly or in a direction opposite to that in which the carrying pockets move, so that the brush operates to sweep off any beans which may lie on top of the wings and deliver the same into the pockets. This rotary movement of the brush may be derived from any suitable source, for instance, by a chain belt 17 passing around sprocket wheels 18, 19 arranged on the corresponding ends of the shaft of the receiving pulley 6 and the shaft of the rotatable brush, as shown in Fig. 2.

Inasmuch as some of the beans are crooked and more or less of C-shaped form, such beans when deposited in the pockets are liable to project above the upper edges of the wings and possibly clog the machine or interfere with the operation of other devices which subsequently come into play. In order to remove any beans or parts of beans which may project above the wings or pockets and avoid the objection above referred to, means are provided which cut away the beans or parts of beans projecting above the pockets. This cutter mechanism is arranged immediately in rear of the clearing brush and preferably comprises a horizontal clearing cutter blade 20 which is arranged obliquely immediately above the upper edges of the pocket wings and provided with a front cutting edge past which those portions of the beans projecting above the pockets are moved forwardly and cut off flush with the upper ends of the pocket wings. The pieces thus removed from the beans engage with an upright deflecting flange 21 rising from the oblique rear edge of the blade 20 and are discharged at the rear of the same through a passage 22 formed in the left-hand side walls 3. This cutter blade is preferably supported at its front end on a bracket 23 on the right-hand wall 2 while its rear end engages with a stop formed by the rear side of the passageway 22. The blade 20 is yieldingly held in its operative depressed position by means of a spring 24 interposed between the upper side of this cutter blade and a cross bar 25 secured to the adjacent upper parts of the side walls, as shown in Figs. 1, 2, 3 and 6. By this means the clearing cutter blade is free to yield upwardly in case any hard substance which is difficult to cut, such as a stick of wood, or the like, should be accidentally fed with the beans into the pockets of the carrier, thereby preventing the cutter from being injured.

As the beans continue their forward movement under the propelling action of the endless carrier after passing the clearing cutter blade, the beans are first moved transversely of the carrier by a fluid blast into engagement with a gage so that one of the ends of the beans project to a limited extent beyond the respective ends of the pockets or buckets and then these projecting ends of the beans are cut off by a cutting device. Thereafter the beans during their continued forward movement with the carrier are moved transversely of the same in the opposite direction by another fluid blast so that the opposite ends of the beans engage with another gage and these last-mentioned ends of the beans project to a limited extent beyond the corresponding ends of the pockets and then these last mentioned projecting ends of the beans during their continued forward movement are cut off by another cutting device. This first shifting, gaging and cutting mechanism and the second shifting, gaging and cutting mechanism are substantially alike in construction, but these two sets of devices are arranged transversely out of line relatively to the endless carrier, so that they operate successively upon opposite ends of the beans in the carrier. As shown in the drawings, the first set of bean-shifting, gaging and cutting devices is so arranged that the beans during their forward movement are first cut off at the left-hand ends thereof while the second set of shifting, gaging and cutting devices are so arranged that they operate to trim off the right-hand ends of the beans after the left-hand ends have been cut off.

Figures 1, 9, 12:
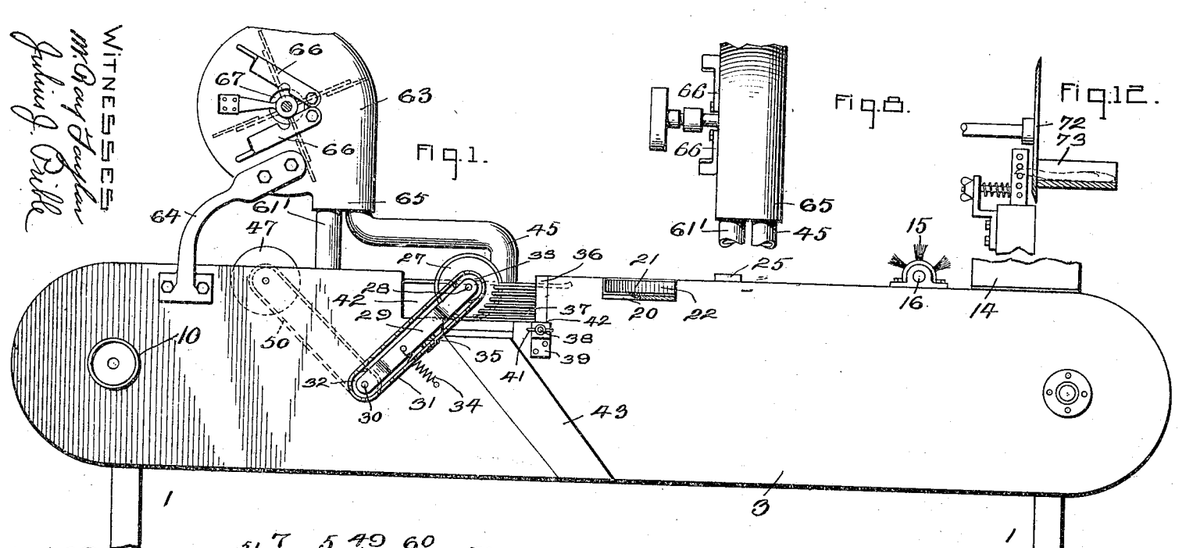
Figure 1 is a side elevation of a trimming or snipping machine embodying one form of my improvements.
Fig. 9 is a side elevation showing another form of machine constructed in accordance with my invention.
Fig. 12 is a fragmentary cross section showing a slightly modified form of the cutting device for severing the ends of the beans.
Figure 4:
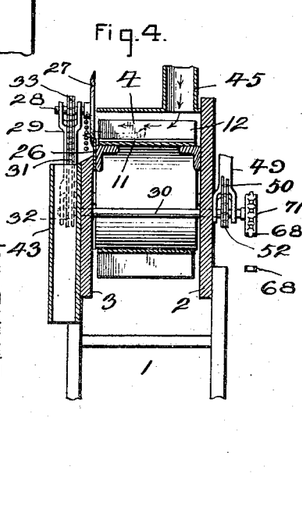
Figs. 4, 5 and 6 are vertical transverse sections taken in the correspondingly-numbered lines in Fig. 2.

The first cutting device preferably comprises a lower stationary cutting blade 26 arranged lengthwise of the upper stretch of the carrying belt adjacent to the left-hand edge thereof at a suitable distance forwardly of the clearing blade, and an upper rotatable blade 27 having the form of a disk which coöperates with the lower stationary blade 26 and preferably engages with the outer side thereof. The first rotary cutter 27 is pivotally mounted by means of a short arbor, spindle or shaft 28 which is journaled in a bearing on the upper end of a forwardly-inclined supporting rock arm 29. The lower rear end of this rock arm is mounted loosely upon the adjacent outer end of a cutter driving shaft 30, which is journaled horizontally and transversely in suitable bearings on the rear part of the side walls. Motion is transmitted from the driving shaft 30 to the arbor of the cutter disk 27 by means of a chain belt 31 passing around lower and upper sprocket wheels 32, 33 secured respectively to the driving shaft 30 and the arbor of the front cutter disk, as shown in Figs. 1, 2 and 4. The cutter supporting arm 29 is yieldingly held in its depressed position by a spring 34 connecting the same with the adjacent side wall, and its movement in this direction is arrested by means of the stop 35 arranged on the adjacent part of the left hand side wall in position to be engaged by the rock arm 29. The first gage associated with the first end cutter mechanism preferably comprises an upright post or bar 36 arranged at a suitable distance in front of the first pair of upper and lower cutter blades and a plurality of gage rods or bars 37 arranged horizontally and lengthwise of the carrier and projecting forwardly from this post so that their rear ends extend beyond the cutting edge of the first cutter disk and therefore bridge the space between the gage post 36 and the first cutter disk, as shown in Figs. 1 and 2. The gage bars 37 are arranged outwardly from the fixed and movable blades of the first cutter a distance equal to the amount of material or length of piece which is to be cut off from the respective ends of the beans which are operated upon by this gage and the accompanying end cutter mechanism. For the purpose of permitting variation in the length of the pieces which are cut off from the ends of the beans, the gage post 36 and its gage rods are adjustable horizontally and transversely relatively to the carrier, this being preferably effected by means which comprise a horizontal transverse adjusting rod 38 secured at its inner end to the lower part of the gage post 36 and sliding with its outer part through a bracket 39 mounted on the outer side of the adjacent side wall, a spring 40 surrounding the adjusting rod and bearing with its opposite ends against the outer side of the gage post and the inner side of the bracket, and an adjusting screw nut 41 arranged on the outer end of the adjusting rod and bearing against the outer side of the bracket 39. Upon tightening the screw nut 41 the gage post and accompanying gage rods will be drawn laterally outward and thereby increase the distance from the cutting line to the gage rods, so that a correspondingly greater length of piece will be snipped off from the respective ends of the beans, while upon loosening the nut, this spring will push the gage post and rods laterally inward and thereby reduce the distance from the cutting line to the gage bars and shorten the length of pieces which are cut off from the ends of the beans which are operated upon by the companion end cutter mechanism. During this lateral movement of the gage post and rods, the same are prevented from turning with the adjusting rod by engaging the front side of this post with the vertical front edge of a recess 42 in the left-hand side wall which receives this gage and the associated upper and lower blades of the first end cutter mechanism. The lower end of the gage post 36 also rests on the bottom of this recess 42 in its various adjusted positions, so that the gage is reliably held in its operative position at all times. The rear ends of the gage rods 37 are not connected with each other so that the gage-post and its rods in effect form a comb-like structure between the teeth or prongs of which the tips or ends of the beans may be pushed when moving the beans laterally toward the same preparatory to advancing the beans past the associated end cutter blades for removing the corresponding ends of the beans. By leaving the rear ends of the gage rods unconnected, the snips or ends of the beans which are removed from the bodies thereof are free to escape rearwardly from the slots or spaces between the gage-rods and no tendency exists to clog the machine by the pieces which are cut off from the ends of the beans. The pieces of beans removed from the ends of the bodies thereof drop from the gage bars and the coöperating cutter blades into the upper end of a chute 43 which latter carries them to a suitable place or receptacle provided for this purpose.

Various means may be employed for moving the beans laterally against the first gage preparatory to snipping off the corresponding ends thereof but it is preferable to employ for this purpose a fluid pressure, such as air pressure. The means for thus shifting the beans transversely in the pockets of the carrier by means of air pressure, as shown in the drawings, preferably comprises a cover or plate 44 which extends horizontally and lengthwise over the tops of the carrying-pockets and between the side walls adjacent to the first gage and end cutter mechanism, and an air pipe, passage or conduit 45 extending downwardly through this cover transversely in line with the first gage and adjacent to that end of the tops of the carrying pockets which is opposite the ends of these pockets adjacent to which the first gage is arranged. A blast or stream of air is discharged continuously from the first conduit 45 downwardly into the right hand ends of the pockets as they successively pass underneath the first air pipe and which air then moves lengthwise of each pocket or in a direction of the carrier toward the first gage, whereby this air is caused to push the beans in each pocket until their advancing ends engage with the respective gage preparatory to being cut off by the adjacent cutter blades. During the transverse movement of the beans in the pockets, the same are practically lifted or floated by the stream of air passing transversely through the pockets, so that the movement of the beans in this direction is not materially resisted by frictional engagement with the bottoms or walls of the pockets and a comparatively light air pressure will suffice for reliably shifting the beans toward the first gage and end cutter mechanism which operate upon the ends thereof.

Figures 5, 6:
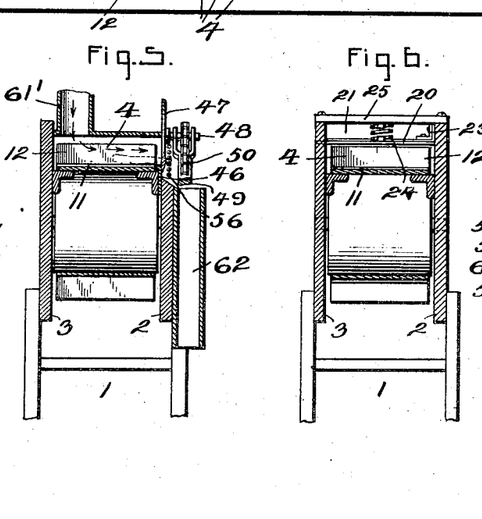
Figure 7:
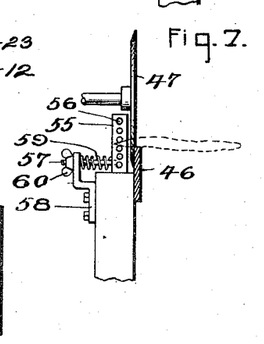
Fig. 7 is a fragmentary vertical transverse section taken on an enlarged scale, in line 7—7, Fig. 2.
Figure 9:
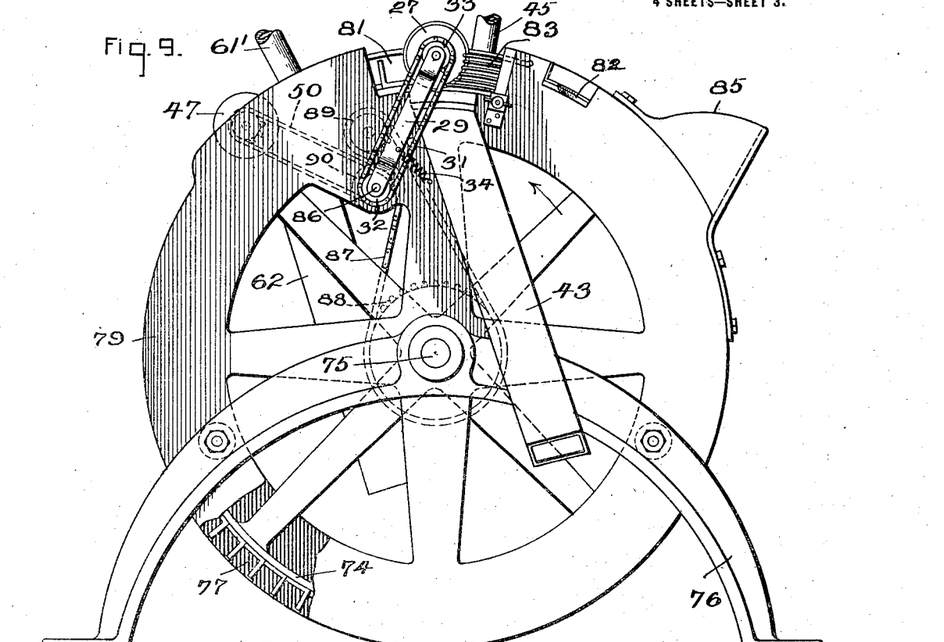

The cover 44 extends rearwardly over the tops of the buckets so that these tops are practically closed above the place where the pockets are located when the beans are acted upon the second time for gaging the same at their opposite ends and cutting off the respective ends of the beans to the required extent. The second end cutter mechanism which operates to cut off the opposite ends of the beans which are carried past the same by the buckets is constructed like that of the first end cutter mechanism and comprises a lower fixed cutter blade 46 arranged horizontally and lengthwise on the right hand side wall adjacent to the corresponding edge of the carrying belt and an upper rotary cutter blade or disk 47 coöperating with the lower blade 46 and preferably engaging with the outer side thereof. The second cutter disk is mounted on a horizontal arbor or spindle 48 which is journaled transversely in a bearing at the upper rear end of a rearwardly inclined rock arm 49 which is mounted loosely at its lower end on the right hand end of the driving shaft 30. Power is transmitted from the cutter driving shaft 30 to the spindle or arbor of the rear cutter disk by means of a chain belt 50 passing around sprocket wheels 51, 52 mounted on the rear cutter spindle and the corresponding end of the cutter driving shaft, as shown in Figs. 2 and 5. The rear cutter arm 49 is yieldingly held in its depressed position by means of a spring 53 connecting the same with the adjacent side wall and the downward movement of this arm is limited by means of a stop 54 mounted on the right-hand wall in position to be engaged by the rear cutter arm. By thus mounting the front and rear cutter arms so as to enable them to yield upwardly, it is possible for the cutter disks to rise the required extent for clearing any hard articles or objects which may be accidentally presented to the same, such as a stick of wood or the like, thereby preventing breakage of the cutter disk, or injuring the same.

Figure 3:
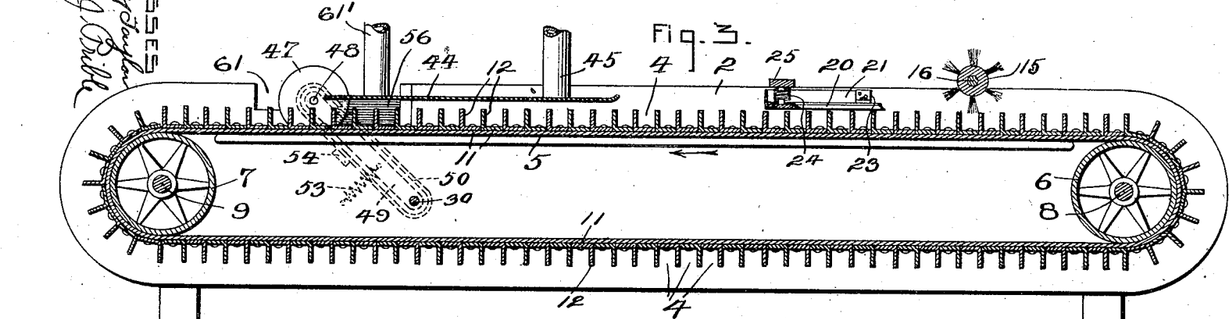
Fig. 3 is a vertical, longitudinal section taken in line 3—3, Fig. 2.

The rear gage against which the opposite ends of the beans are moved preparatory to being operated upon by the second end cutter mechanism is also constructed like the first gage device already described and comprises an upright gage-post 55 arranged in front of or outside of the cutting line adjacent to the second pair of end cutter blades, a plurality of horizontal longitudinal gage rods 56 projecting rearwardly from the second gage-post and along the outer side of the adjacent second cutter disk, and means for adjusting the second gage-post and rods comprising an adjusting rod 57 secured at its inner end to the second gage post while its outer end passes through a bracket 58 on the adjacent side wall, a spring 59 interposed between the second gage post and the second bracket 58, and a screw nut 60 mounted on the adjusting rod 57 and engaging with the outer side of the bracket 58, as shown in Fig. 2. The second gage and the second cutter blades are arranged in a recess 61 formed in the companion side wall of the machine and this gage is held against turning with the adjusting rod by engagement of the post 55 with the front edge and bottom of this recess, as shown in Fig. 3.

By constructing the gages in the form of a comb, the blast of air which moves the beans against the same is free to escape through the spaces between the gage rods, thereby permitting the beans to be moved promptly and reliably against the gage rods instead of rebounding therefrom as would be liable to occur if the escape of air were resisted and a back pressure of air resulted therefrom. The beans are shifted in a reverse direction lengthwise in the pockets or transversely relatively to the line of movement of the carrier, so that the opposite ends thereof engage with the second gage rods, this being also preferably effected by means of fluid under pressure, such as air, which is supplied by a pipe or conduit $61^1$ which opens downwardly through the cover or plate 44 transversely in line with the second gage rods adjacent to the left-hand side wall. As the air issues from the lower end of the second air pipe, the same tends to lift the beans from the bottom of the pockets and then floats and pushes the same lengthwise of the pockets toward the second gage, preparatory to cutting off so much of the length of the beans at the corresponding ends thereof as extends from the cutting line to the second gage. The snips or pieces thus removed the second time from the beans are received by a chute 62 which has its upper end arranged adjacent to the outer side of the second gage and cutter mechanism and delivers these snips or pieces into a suitable receptacle or place provided to receive them. It will now be clear that the beans as they are moved forwardly by the carrier underneath the cover 44 are first propelled by air pressure transversely of the carrier against a gage and then cut off at the respective gaged ends, and then these beans are moved in the opposite direction crosswise of the carrier by air pressure into engagement at their other ends with a gage preparatory to cutting off the last mentioned ends of the beans. After both ends of the beans have been thus cut or trimmed, the same continue their forward movement with the pockets of the carrier until they reach the rear turn of the carrier where they are discharged from the pockets thereof onto the floor or into a suitable receptacle provided for that purpose.

The air under pressure may be supplied to the two air delivery conduits or pipes 45, $61^1$ in any suitable manner, but preferably by means of a blower or fan having its casing 63 supported over the rear part of the endless carrier by means of a bracket 64, as shown in Figs. 1 and 2, or otherwise, and having its outlet spout or nozzle 65 connected with the receiving ends of said air conduits. Owing to the fact that the beans are initially deposited in the pockets of the carrier adjacent to the left-hand wall by the automatic feeding mechanism, it requires but little air-pressure to shift the beans further toward the left in order to engage the respective ends thereof with the first gage but a greater amount of air pressure is required to shift the beans in the pockets from the extreme left ends thereof to the extreme right ends thereof from the time the beans leave the first cutting device up to the time they reach the second gage and for the further reason that the distance between the first cutting device and the second gage is comparatively short. In order, therefore, to adjust the air pressure between the front and rear delivery pipes 45, $61^1$ in accordance with the work which the air conveyed by the same is required to do, the nozzle or outlet of the blower casing is arranged comparatively close to the place where the beans are shifted crosswise of the carrier the second time, so that the rear air pipe $61^1$ may be made comparatively short while the nozzle of the blower is arranged a greater distance from the place where the beans are shifted in the pockets transversely of the carrier to the first gage and therefore necessitates making the first air pipe somewhat longer than the rear air pipe. Due to this construction, the air issuing from the blower is delivered with its greatest effect through the rear air pipe $61^1$ into the carrying pockets when the same are transversely in line with the second gage, while the air delivered by the front pipe 45 into the carrying pockets when they are in line with the front gage is somewhat weaker, thereby adapting the pressure of the air in accordance with the requirements at different times and insuring reliable shifting of the beans and engagement of the same with the respective gages, preparatory to cutting off the opposite ends thereof successively.

Inasmuch as the blower is usually run at a definite speed, means are provided for regulating the air pressure which is delivered by the same into the pockets of the carrier without altering the speed of the blower shaft which carries the blades of the same. For this purpose two gates 66, 66 are pivotally mounted on the outer side of the blower casing adjacent to the eye 67 thereof, so that either one or both of these gates may be shifted crosswise of the eye of the blower for covering the same more or less, thereby enabling the amount of air which is drawn through the eye of the blower into the casing to be regulated and the amount of air discharged through the outlet spout or nozzle of the blower to be adjusted in accordance with the requirements to suit the size or weight of the beans which are being operated upon, or to meet other conditions.

The driving shaft 30 of the rotatable end cutters may be operated in any suitable manner, the means shown for this purpose in Figs. 2, 4 and 5, having been found satisfactory in practice and comprising a chain belt 68 passing with one of its turns around a sprocket wheel 69 mounted on the rear carrier shaft and with its front turn around an idler sprocket wheel 70 mounted on the right-hand side wall, while the upper stretch of this belt engages with a sprocket-wheel 71 secured to the right hand end of the cutter driving shaft 30.

Instead of providing a fixed lower blade for coöperation with each of the upper movable cutter disks, as shown in Figs. 1, 2, 4, 5 and 7, substantially the same result may be produced by arranging each of the upper cutter disks so close to the corresponding ends of the carrier pockets that this end serves as a support or shearing edge with which the adjacent cutter disk may coöperate for severing the end portions of the beans which are arranged in the pockets and project from the ends of the beans to the companion gage, such a cutter disk being shown at 72 in connection with a pocket 73 in Fig. 12.

Figure 10:
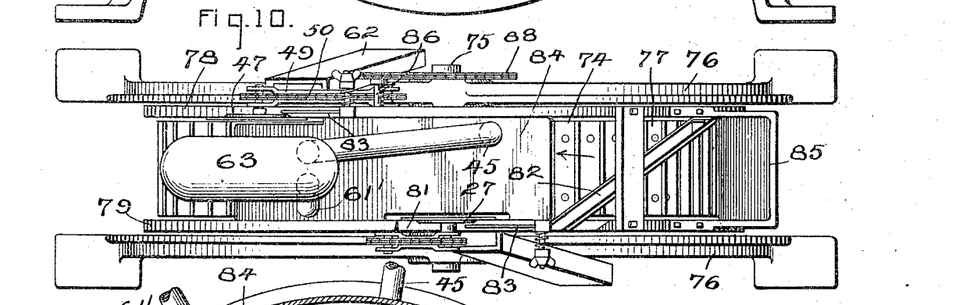
Fig. 10 is a top plan view of the same.
Figure 11:
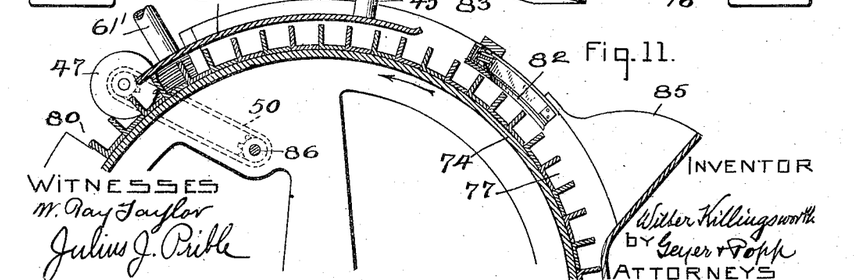
Fig. 11 is a fragmentary, vertical longitudinal section of the upper part of the machine shown in Figs. 9 and 10.

In the construction of my improved trimming or snipping machine which is shown in Figs. 9, 10 and 11, the same is organized to employ an endless carrier, the body 74 of which is constructed in the form of a circular wheel which is mounted on a horizontal driving shaft 75 turning in bearings on stationary frame 76 and provided on its periphery with a plurality of buckets, pockets or channels 77 which are open at the top and also at opposite ends of the buckets. The side walls 78, 79 in the construction shown in Figs. 9, 10 and 11, are also of substantially circular form and fixedly mounted on the main frame on opposite sides of the pockets of the carrying wheel, so as to practically close the opposite ends of the pockets excepting at the places where the walls are recessed, as shown at 80, 81 for the reception of the front and rear gaging and end cutting mechanism which are arranged successively relatively to the circular carrier and on opposite sides thereof for the purpose of first trimming off one end of the beans in the pockets and then the other end thereof. So far as the front and rear gages, the means for shifting the beans by air pressure against the gages, and the cutting devices are concerned the constructions shown in Figs. 9, 10 and 11, are substantially like the corresponding parts employed in the construction shown in Figs. 1–8 and the same reference characters as well as the operation or function attributed to the first-described construction may also be applied to the construction shown in Figs. 9, 10 and 11. It is understood however that in the circular form of machine shown in the last-mentioned figures it is necessary to curve the preliminary or clearing cutter 82, the gage rods 83 and the cover 84 concentrically with the axis of the circular carrier as clearly shown in these figures. The beans to be snipped are supplied to the buckets either by hand or machinery into a hopper 85 which directs the same into the pockets on the rising side of the same and before they reach the preliminary or clearing cutter 82, and after the beans have been trimmed at opposite ends thereof, the same are discharged from these buckets on the descending side of the circular carrier. Motion is transmitted from the main driving shaft 75 which operates the circular carrier to the cutter driving shaft 86 of the cutter mechanism by means of a chain belt 87 passing at one turn around a sprocket wheel 88 on the carrier shaft 75 and at its other turn around an idler sprocket wheel 89 mounted on one of the circular side walls, while one of the stretches of this belt engages with a sprocket wheel 90 mounted on the cutter shaft 86.

If desired the blowing of the beans for propelling the same transversely against a gage preparatory to cutting off the ends thereof may be aided by suction air pressure exerted on the beans at the same time that they are subjected to a pushing air blast. Such a construction is shown in Figs. 13 and 14 in which an air blast issuing from the delivery spout or nozzle 91 of a blower or fan 92 causes the beans to be pushed transversely in the pockets 93 of the bean carrier against a gage 94 and at the same time the beans are sucked by air pressure against this gage by a suction spout or nozzle 95 arranged adjacent to the outer side of the gage and communicating with the eye of the blower, whereby the beans positioned preparatory to advancing the same by the movable carrier 109 to the cutter blades 96, 97 for trimming off the ends thereof resting against the gage.

Figure 15:
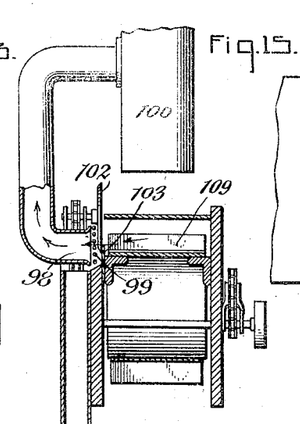
Fig. 15 is a fragmentary vertical transverse section of a snipping machine having means whereby the beans are sucked by air pressure against the gage.
Figures 16, 18:
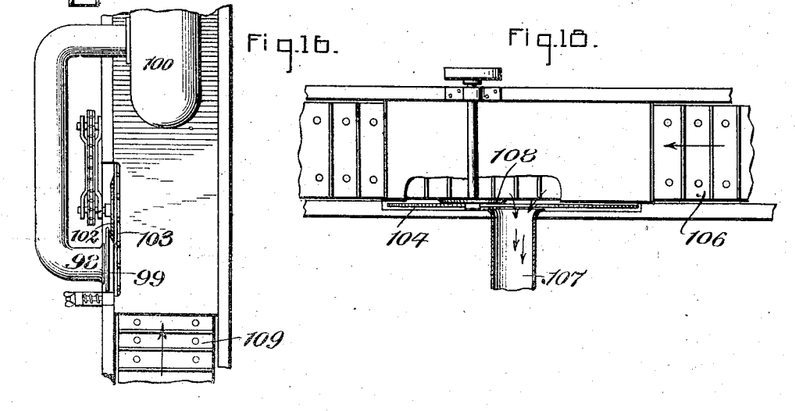
Fig. 16 is a top plan view of the same.
Fig. 18 is a top plan view thereof.

The gaging of the beans preparatory to snipping the ends thereof may also be effected solely by air suction, an organization of the kind being shown in Figs. 15 and 16 in which 98 represents a suction nozzle arranged outside of the gage 99 and connected with the eye of a blower or fan 100 so that the beans in pockets 101 of the carrier upon reaching the gage and suction nozzle 98 are drawn transversely against the gage just before they are operated on by the knives 102, 103 which trim off the gaged end of the beans.

Figure 17:
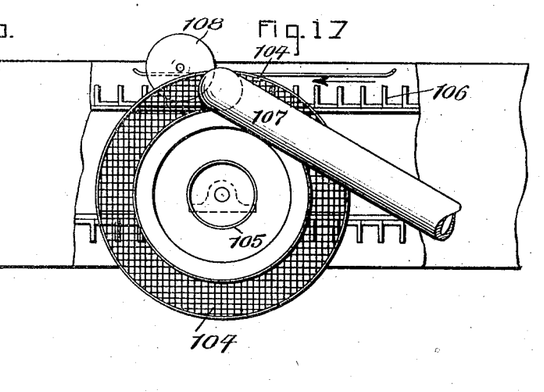
Fig. 17 is a fragmentary side elevation of a bean snipper showing a modification in the construction of the gage.

The gage may also be variously constructed, for instance, as shown in Figs. 17 and 18 the gage 104 is constructed in the form of a ring shaped screen which is mounted on a vertically rotating wheel or hub 105 so that the upper part of the gage moves along the ends of the carrier pockets 106 and at the same rate of speed. As the pockets reach the upper part of the circular screen gage the beans therein may be moved transversely against the rotary gage, for instance, by an air suction nozzle 107 arranged outside of the gage horizontally in line with the path of the pockets, whereby the beans are moved into position before reaching the cutter 108 which severs the ends thereof.

Figure 13:
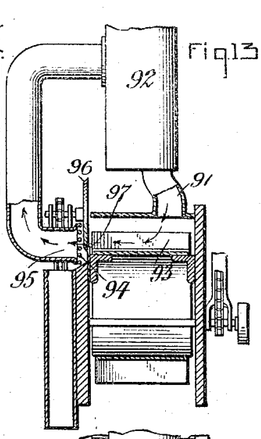
Fig. 13 is a fragmentary vertical transverse section of a snipping machine provided with means for pushing and pulling the beans against the gage by air pressure.
Figure 14:
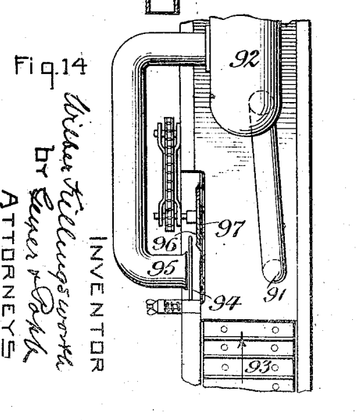
Fig. 14 is a top plan view of the same.

In case the air suction nozzle connects with the eye of the casing of the blower which also supplies the blast of air for the pushing nozzle, as shown in Figs. 13 and 14 the suction nozzle will be slightly in front of the place where the ends of the beans are cut off so that the severed snips or ends are not drawn into the blower casing and delivered into the pockets of the carrier. If desired the air may be pushed through the delivery spout 91 by one blower and the air drawn through the suction spout 95 by separate blowers or other air propelling devices.

In the constructions shown in Figs. 15-18, the suction nozzles 98 and 107 may be arranged immediately adjacent to the cutting position, if desired, inasmuch as any severed ends or snips of beans entering these nozzles may be discharged through the outlet of the blower at some convenient place.

My improved machine for snipping or trimming string beans or the like is very efficient in operation, it has a large capacity and is capable of snipping the opposite ends of the beans reliably and without undue waste, it is compact in construction and can be run with a comparatively small amount of power.

I claim as my invention:

1. A machine for trimming the ends of articles comprising an endless carrier having a plurality of pockets adapted to receive the articles to be trimmed, and cutting means arranged above the path of said pockets between opposite ends thereof and adapted to cut off those parts of the articles in said pockets which project above the same.

2. A machine for trimming the ends of articles comprising an endless carrier having a plurality of pockets adapted to receive the articles to be trimmed, and cutting means arranged above the path of said pockets and adapted to cut off those parts of the articles in said pockets which project above the same, said cutting means comprising a blade arranged obliquely adjacent to the top of said pockets.

3. A machine for trimming the ends of articles comprising an endless carrier having a plurality of pockets adapted to receive the articles to be trimmed, and cutting means arranged above the path of said pockets and adapted to cut off those parts of the articles in said pockets which project above the same, said cutting means comprising a blade arranged obliquely adjacent to the top of said pockets and a flange projecting upwardly from the rear edge of said blade.

4. A machine for trimming the ends of articles comprising an endless carrier having a plurality of pockets adapted to receive the articles to be trimmed, and cutting means arranged above the path of said pockets and adapted to cut off those parts of the articles in said pockets which project above the same, said cutting means comprising a blade arranged obliquely adjacent to the top of said pockets and a spring for holding said blade yieldingly in its depressed position.

5. A machine for trimming the ends of articles comprising two side walls one of which is provided with an outlet recess, an endless carrier arranged between said walls and having a plurality of pockets adapted to receive the articles to be trimmed, an oblique cutter blade arranged above the path of said pockets and having its rear end arranged in said recess, and means for supporting the front end of said blade on the other side wall.

6. A machine for trimming the ends of articles comprising two side walls one of which is provided with an outlet recess, an endless carrier arranged between said walls and having a plurality of pockets adapted to receive the articles to be trimmed, an oblique cutter blade arranged above the path of said pockets and having its rear end arranged in said recess, means for supporting the front end of said blade on the other side wall, a cross bar mounted on said walls above the carrier, and a spring interposed between said blade and cross bar and operating to hold the same yieldingly in its depressed position.

7. A machine for trimming articles comprising an endless carrier having a plurality of transverse pockets adapted to receive the articles to be trimmed, a cutting device arranged adjacent to the path of said pockets at the ends thereof and adapted to sever the respective ends of the articles in said pockets, and a gage arranged in front of said cutting device for determining the extent of projection of said articles across the cutting line comprising a plurality of longitudinal gage rods arranged one above the other and having their rear ends disconnected, and a post supporting said rods at the front ends thereof.

8. A machine for trimming articles comprising an endless carrier having a plurality of transverse pockets adapted to receive the articles to be trimmed, a cutting device arranged adjacent to the path of said pockets at the ends thereof and adapted to sever the respective ends of the articles in said pockets, and a gage arranged in front of said cutting device for determining the extent of projection of said articles across the cutting line comprising a plurality of longitudinal gage rods arranged one above the other and having their rear ends disconnected, a post supporting said rods at the front ends thereof, and means for adjusting said post and rods transversely relatively to said carrier.

9. A machine for trimming articles comprising an endless carrier having a plurality of transverse pockets adapted to receive the articles to be trimmed, a cutting device arranged adjacent to the path of said pockets at the ends thereof and adapted to sever the respective ends of the articles in said pockets, and a gage arranged in front of said cutting device for determining the extent of projection of said articles across the cutting line comprising a plurality of longitudinal gage rods arranged one above the other and having their rear ends disconnected, a post supporting said rods at the front end thereof, and means for adjusting said post and rods transversely relatively to said carrier, comprising an adjusting rod connected at its inner end with said post, a fixed bracket through which the outer end of said adjusting rod slides, a spring interposed between said post and said bracket, and a screw nut arranged on said adjusting rod and bearing against the outer side of said bracket.

10. A machine for trimming the ends of articles comprising a carrier having a plurality of transverse pockets adapted to receive the articles to be trimmed, means for shifting said articles transversely in said pockets, a gage against which the ends of the articles in said pockets are moved by said shifting means and which comprises a plurality of rods arranged parallel with the line of movement of said carrier and having their rear ends disconnected and a post supporting the front ends of said rods, and a cutting device past which those ends of said articles adjacent to said gage are moved by said carrier for severing said ends.

11. A machine for trimming the ends of articles comprising a carrier having a plurality of transverse pockets adapted to receive the articles to be trimmed, means for shifting said articles transversely in said pockets, a gage against which the ends of the articles in said pockets are moved by said shifting means and which comprises a plurality of rods arranged parallel with the line of movement of said carrier, means for adjusting said rods transversely of the direction of movement of the carrier, and a cutting device past which those ends of said articles adjacent to said gage are moved by said carrier for severing said ends.

12. A machine for trimming the ends of articles comprising a carrier having a plurality of transverse pockets adapted to receive the articles to be trimmed, means for shifting said articles transversely in said pockets, a gage against which the ends of the articles in said pockets are moved by said shifting means and which comprises a plurality of rods arranged parallel with the line of movement of said carrier, a post supporting the rear ends of said rods, an adjusting rod connected with said post, a bracket receiving said adjusting rod, a spring interposed between one side of said post and said bracket, and a screw nut arranged on said adjusting rod and engaging with the other side of said bracket, and a cutting device past which those ends of said articles adjacent to said gage are moved by said carrier for severing said ends.

13. A machine for trimming the ends of articles comprising a carrier having a plurality of transverse pockets which are adapted to receive the articles to be trimmed, means for shifting said articles successively in opposite directions transversely of the carrier comprising fluid means operating on the articles in said pockets successively in opposite directions, the pressure of the fluid means which operates first on said articles being weaker than the pressure of the fluid which operates on the articles the second time, gages against which the articles are successively moved by said fluid means, and cutting devices which operate to sever the respective ends of said articles adjacent to said gages.

14. A machine for trimming the ends of articles comprising a carrier having a plurality of transverse pockets which are adapted to receive the articles to be trimmed, means for shifting said articles successively in opposite directions transversely of the carrier comprising a fluid propelling device, a long pipe leading from said propelling device and having its outlet arranged on one side of the path of said pockets and a short pipe leading from said propelling device and having its outlet arranged on the opposite side of the path of said pockets at a point rearwardly of and transversely out of line with the outlet of said long pipe, gages against which the articles are successively moved by said fluid means, and cutting devices which operate to sever the respective ends of said articles adjacent to said gages.

Witness my hand this 14th day of August, 1914.

WILBER KILLINGSWORTH.

Witnesses:
A. SULZBACHER,
MARTIN F. CADDEN.

Copies of this patent may be obtained for five cents each, by addressing the "Commissioner of Patents, Washington, D. C."